US012703343B2

(12) United States Patent
Ito et al.

(10) Patent No.: US 12,703,343 B2
(45) Date of Patent: Aug. 11, 2026

(54) VEHICLE DRIVE DEVICE

(71) Applicant: AISIN CORPORATION, Kariya (JP)

(72) Inventors: Yoshiaki Ito, Kariya (JP); Takahiro Fujiwara, Kariya (JP); Makoto Chujo, Kariya (JP)

(73) Assignee: AISIN CORPORATION, Kariya (JP)

( * ) Notice: Subject to any disclaimer, the term of this patent is extended or adjusted under 35 U.S.C. 154(b) by 392 days.

(21) Appl. No.: 18/274,087

(22) PCT Filed: Feb. 16, 2022

(86) PCT No.: PCT/JP2022/006229
§ 371 (c)(1),
(2) Date: Sep. 25, 2024

(87) PCT Pub. No.: WO2022/209383
PCT Pub. Date: Oct. 6, 2022

(65) Prior Publication Data

US 2025/0178584 A1 Jun. 5, 2025

(30) Foreign Application Priority Data

Mar. 30, 2021 (JP) ................................ 2021-058718

(51) Int. Cl.
*B60W 20/10* (2016.01)
*B60K 6/387* (2007.10)
(Continued)

(52) U.S. Cl.
CPC ............ *B60W 20/10* (2013.01); *B60K 6/387* (2013.01); *B60K 6/46* (2013.01); *B60W 10/08* (2013.01);
(Continued)

(58) Field of Classification Search
CPC ................ B60W 20/10; B60W 10/08; B60W 2510/1015; B60W 2710/021;
(Continued)

(56) References Cited

U.S. PATENT DOCUMENTS 8,113,987 B2 * 2/2012 Kumazaki ................ B60K 6/40 477/6
2008/0255748 A1 * 10/2008 Kumazaki ............ B60W 10/08 701/102
(Continued)

FOREIGN PATENT DOCUMENTS

JP 2020-6782 A 1/2020

OTHER PUBLICATIONS

International Search Report for PCT/JP2022/006229 dated, Apr. 26, 2022 (PCT/ISA/210).

*Primary Examiner* — Behrang Badii
(74) *Attorney, Agent, or Firm* — Sughrue Mion, PLLC

(57) ABSTRACT

In engagement control for changing a clutch WSC from a disengaged state to a fully engaged state after engagement determination is made on the clutch WSC, a control device executes an engagement preparation phase in which no torque capacity is generated and an actual engagement phase in which a torque capacity is generated and the fully engaged state is achieved. In a case where a vehicle is traveling with a driving force of a rear motor drivingly connected to a rear wheel when executing the engagement control, the control device controls a rotation speed of a rotary electric machine to be higher than a rotation speed of a transmission member when the vehicle is accelerating, and controls the rotation speed of the rotary electric machine to be lower than the rotation speed of the transmission member when the vehicle is decelerating.

6 Claims, 4 Drawing Sheets

(51) Int. Cl.
*B60K 6/46* (2007.10)
*B60W 10/08* (2006.01)

(52) U.S. Cl.
CPC ............... *B60W 2510/1015* (2013.01); *B60W 2710/021* (2013.01); *B60W 2710/081* (2013.01); *B60W 2710/083* (2013.01); *B60Y 2200/92* (2013.01)

(58) Field of Classification Search
CPC ..... B60W 2710/081; B60W 2710/083; B60W 2510/0283; B60W 20/19; B60W 10/02; B60K 6/387; B60K 6/46; B60K 23/08; B60K 6/48; B60K 6/448; B60K 6/547; B60K 6/52; B60K 6/54; B60Y 2200/92; F02D 29/02; F02D 41/022; F02D 2200/101; B60L 2240/16; B60L 2240/421; B60L 2240/486; B60L 2240/507; B60L 2260/26; B60L 15/2054; B60L 50/16; Y02T 10/62
See application file for complete search history.

(56) References Cited

U.S. PATENT DOCUMENTS

| | | | | |
|---|---|---|---|---|
| 2011/0245033 | A1* | 10/2011 | Sato | B60K 6/442 180/65.265 |
| 2012/0264565 | A1* | 10/2012 | Kobayashi | B60L 50/16 477/5 |
| 2015/0344019 | A1* | 12/2015 | Matsui | B60K 6/46 180/65.265 |
| 2016/0280217 | A1* | 9/2016 | Sato | B60W 20/40 |
| 2019/0359216 | A1* | 11/2019 | Yamada | B60K 6/383 |
| 2025/0178584 | A1* | 6/2025 | Ito | B60K 6/387 |

* cited by examiner

VEHICLE DRIVE DEVICE

CROSS REFERENCE TO RELATED APPLICATIONS

This application is a National Stage of International Application No. PCT/JP2022/006229 filed Feb. 16, 2022, claiming priority based on Japanese Patent Application No. 2021-058718 filed Mar. 30, 2021, the entire contents of which are incorporated in their entirety.

TECHNICAL FIELD

This technology relates to a vehicle drive device to be mounted on a vehicle such as an automobile.

BACKGROUND ART

In recent years, a hybrid vehicle including a rear motor for driving rear wheels has been developed as a so-called one-motor parallel hybrid vehicle including an engine, a motor generator (hereinafter simply referred to as "motor"), an engine connection clutch interposed between the engine and the motor, and a transmission mechanism interposed between the motor and front wheels (see, for example, Patent Document 1).

Such a hybrid vehicle may travel by a driving force of the rear motor, for example, in a neutral state in which a predetermined clutch of the transmission mechanism is disengaged and in a state in which the front motor is stopped. When a driver requests acceleration, for example, by depressing an accelerator pedal, the driving force of the rear motor is increased, the front motor is started, and the predetermined clutch of the transmission mechanism is engaged to form a shift speed, thereby driving the front wheels as well to further increase the driving force. At this time, the predetermined clutch of the transmission mechanism is engaged after the front motor is started and the differential rotation of the clutch reaches zero, thereby reducing a shock at the time of clutch engagement.

RELATED ART DOCUMENTS

Patent Documents

Patent Document 1: Japanese Unexamined Patent Application Publication No. 2020-6782 (JP 2020-6782 A)

SUMMARY OF THE DISCLOSURE

Problem to be Solved by the Various Aspects of the Disclosure

In the hybrid vehicle described in Patent Document 1, however, the predetermined clutch of the transmission mechanism is engaged after the front motor is started and the differential rotation of the clutch reaches zero. Therefore, the rotation speed of the motor is made to match a synchronous rotation speed from the lower side. Thus, the clutch may be engaged when the rotation speed of the front motor is lower than the synchronous rotation speed due to, for example, a possibility that a control delay occurs though the synchronous rotation speed is calculated and the motor is controlled or a possibility that a slight deviation occurs due to a limit of control accuracy. When the clutch is engaged at a rotation speed of the front motor that is lower than the synchronous rotation speed while the vehicle is accelerating by an increase in the driving force of the rear motor, an inertia shock may occur in the vehicle. Therefore, drivability may decrease.

In view of the above, it is an object to provide a vehicle drive device capable of reducing the occurrence of the inertia shock when the clutch is engaged.

Means for Solving the Problem

This vehicle drive device includes a rotary electric machine, a first clutch that is interposed between the rotary electric machine and a transmission member drivingly connected to one wheel out of a front wheel and a rear wheel and that is able to connect or disconnect power transmission between the rotary electric machine and the transmission member, and a control device that controls engagement and disengagement of the first clutch. In engagement control for changing the first clutch from a disengaged state to a fully engaged state after engagement determination is made when the first clutch is disengaged, in a case where a vehicle is traveling with a driving force of a drive source drivingly connected to the other wheel out of the front wheel and the rear wheel when executing the engagement control, the control device controls a rotation speed of the rotary electric machine to be higher than a rotation speed of the transmission member when the vehicle is accelerating, and controls the rotation speed of the rotary electric machine to be lower than the rotation speed of the transmission member when the vehicle is decelerating.

Effects of the Various Aspects of the Disclosure

According to the vehicle drive device, it is possible to reduce the occurrence of the inertia shock when the clutch is engaged.

DETAILED DESCRIPTION OF EMBODIMENTS

An embodiment of a hybrid vehicle 100 according to the present disclosure will be described below with reference to FIGS. 1 to 4. In the present embodiment, the phrase "drivingly connected" refers to a state in which rotation elements are connected so that a driving force can be transmitted therebetween, and is used as a concept including a state in which the rotation elements are connected so as to rotate integrally or a state in which the rotation elements are connected via a clutch etc. so that a driving force can be transmitted therebetween.

Figure 1:
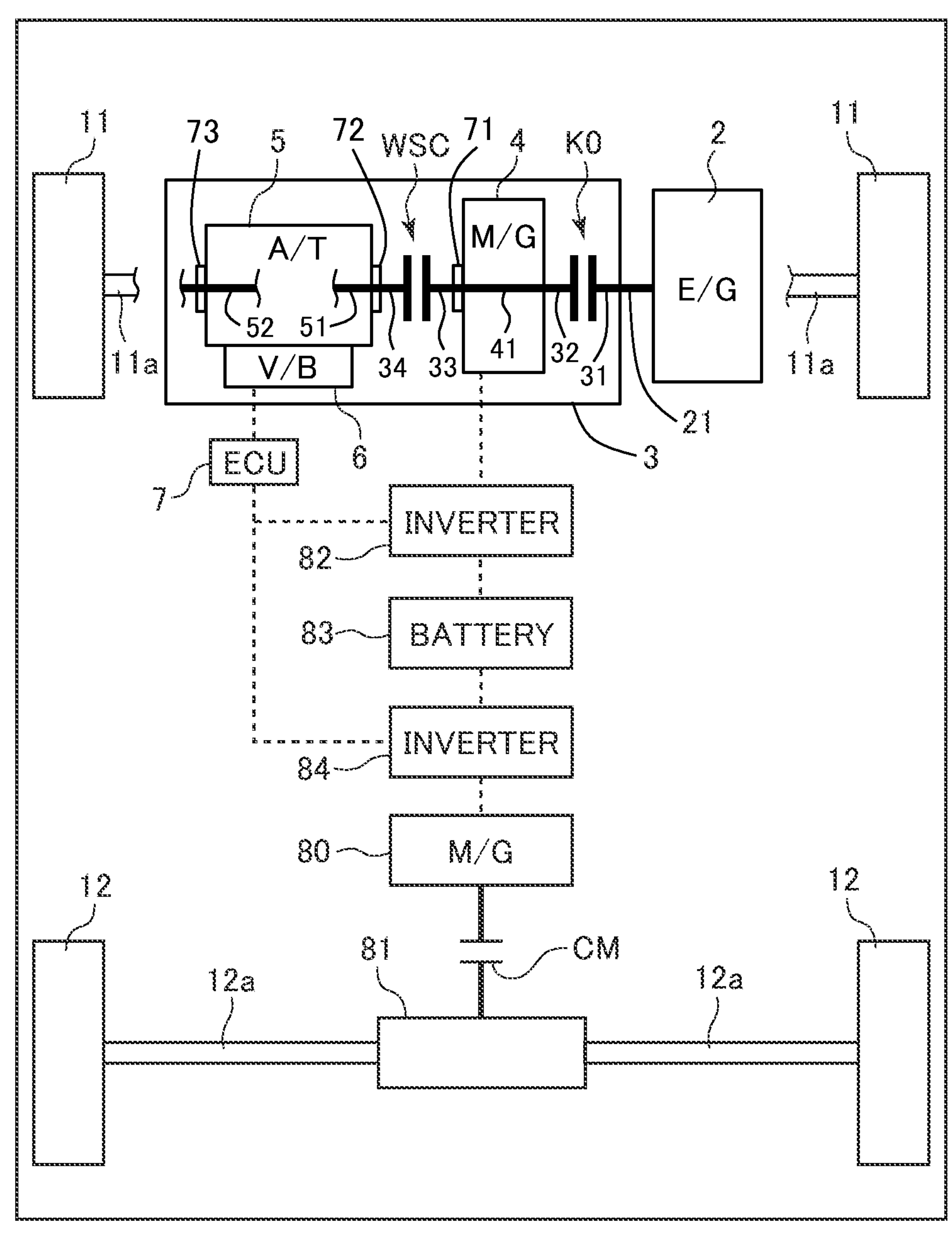
FIG. 1 is a skeleton diagram showing a hybrid vehicle according to an embodiment.

As shown in FIG. 1, a hybrid vehicle 100 includes, as a drive system for left and right front wheels 11, an engine (E/G) 2 and a hybrid drive device 3 that is an example of a vehicle drive device connected to an output shaft 21 of the engine 2. The hybrid vehicle 100 includes a rear motor (M/G) 80 as a drive system for left and right rear wheels 12.

The front wheels 11 are capable of so-called one-motor parallel hybrid traveling (HV traveling). The rear wheels 12 are capable of EV traveling. Four-wheel drive can be achieved by driving the front wheels 11 and the rear wheels 12 simultaneously. In the present embodiment, the front wheel 11 corresponds to one of the front wheel and the rear wheel, and the rear wheel 12 corresponds to the other one of the front wheel and the rear wheel.

First, the drive system for the front wheels 11 will be described. An engine speed Ne and an engine torque Te of the engine 2 are controlled as desired based on commands from an ECU 7 described later. The hybrid drive device 3 includes a clutch K0 that is an example of a second clutch for engine connection, a motor generator (M/G) 4 that is an example of a rotary electric machine, a clutch WSC that is an example of a first clutch for motor generator (hereinafter simply referred to as "motor") connection, a transmission mechanism (A/T) 5, and the ECU 7 that is an example of a control device for controlling them.

The clutch K0 is drivingly connected to a clutch input shaft 31 that is an example of an engine connection member drivingly connected to the output shaft 21 of the engine 2 and a clutch output shaft 32 drivingly connected to a rotor shaft 41 of the motor 4. The clutch K0 is interposed between the clutch input shaft 31 and the clutch output shaft 32. The clutch K0 can connect or disconnect power transmission between the clutch input shaft 31 and the clutch output shaft 32 by frictional engagement. The engagement status of the clutch K0 is controlled as desired depending on a clutch hydraulic pressure supplied from a hydraulic control device (V/B) 6 based on a command from the ECU 7, and the torque capacity is also controlled as desired.

The motor 4 is provided in a power transmission path between the clutch K0 and the clutch WSC. The motor 4 includes a stator and a rotor (not shown). The rotor shaft 41 to which the rotor is connected is drivingly connected to the clutch output shaft 32 of the clutch K0 and a clutch input shaft 33 of the clutch WSC. A motor rotation speed and a motor torque (torque output from the motor 4) of the motor 4 are controlled as desired based on commands from the ECU 7. A motor rotation speed sensor 71 that detects a rotation speed of the rotor shaft 41, that is, a motor rotation speed is provided on an outer peripheral side of the rotor shaft 41 of the motor 4.

The motor 4 is connected to a battery 83 via an inverter 82. The motor 4 driven by supplying electric power output from the battery 83 to the motor 4 via the inverter 82. The battery 83 can be charged through power generation by idling the motor 4 during traveling by the engine 2 or during coasting.

The clutch WSC is drivingly connected to the clutch input shaft 33 drivingly connected to the rotor shaft 41 of the motor 4 and a clutch output shaft 34 drivingly connected to an input shaft 51 of the transmission mechanism 5 described later. The clutch WSC is interposed between the clutch input shaft 33 and the clutch output shaft 34. The clutch WSC can connect or disconnect power transmission between the clutch input shaft 33 and the clutch output shaft 34 by frictional engagement. The engagement status of the clutch WSC is controlled as desired depending on a clutch hydraulic pressure supplied from the hydraulic control device 6 based on a command from the ECU 7, and the torque capacity is also controlled as desired.

The transmission mechanism 5 includes the input shaft 51 that is an example of an input member to be driven by the engine 2 or the motor 4, and an output shaft 52 that is an example of an output member drivingly connected to the front wheel 11. The transmission mechanism 5 can change a speed ratio between the input shaft 51 and the output shaft 52. The input shaft 51 corresponds to a transmission member drivingly connected to the front wheel 11. The transmission mechanism 5 is, for example, a stepped transmission including a gear mechanism structured by combining a plurality of planetary gear trains. By changing friction engagement statuses of a plurality of friction engagement elements (clutches or brakes) based on hydraulic pressures supplied from the hydraulic control device 6, the transmission path is changed to change the speed ratio. The output shaft 52 of the transmission mechanism 5 is drivingly connected to a differential device (not shown). A driving force is transmitted from the differential device to the left and right front wheels 11 via left and right drive shafts 11*a*.

An input rotation speed sensor 72 that detects a rotation speed of the input shaft 51 is provided on an outer peripheral side of the input shaft 51 of the transmission mechanism 5. Further, an output rotation speed sensor 73 that detects a rotation speed of the output shaft 52, that is, an output rotation speed is provided on an outer peripheral side of the output shaft 52 of the transmission mechanism 5. As described above, the output shaft 52 is drivingly connected to the front wheel 11 via the differential device or the like. Therefore, the output rotation speed sensor 73 can also be used to detect a vehicle speed.

In the present embodiment, the clutch input shaft 31, the clutch K0, the motor 4, the clutch WSC, and the transmission mechanism 5 of the hybrid drive device 3 are drivingly connected in series in this order to a power transmission path from the engine 2 to the front wheel 11.

In the present embodiment, the transmission mechanism 5 is described as the stepped transmission, but may be a continuously variable transmission such as a belt type, toroidal type, or cone ring type transmission. In the present embodiment, description is given of the case where the clutch K0 and the clutch WSC are hydraulically controlled friction engagement elements, but the present disclosure is not limited to this, and an electromagnetic clutch or the like may be applied.

The engagement/disengagement states of the clutch K0 and the clutch WSC are controlled by the magnitude of the hydraulic pressure as described above, and are classified into a "disengaged state" in which friction engagement members are separated from each other, a "slip-engaged state" in which torque capacity to be transmitted is generated while slipping, and a "fully engaged state" in which the hydraulic pressure is increased as much as possible so that the friction engagement members are fastened together. The "slip-engaged state" can be defined as a period from a time when a piston strokes from the disengaged state to a stroke end where the piston comes into contact with the friction engagement member to a time when the rotation speeds of the friction engagement members are synchronized with each other. The "disengaged state" can be defined as a state in which the piston is located before the stroke end and is separated from the friction engagement member.

The hydraulic control device 6 is structured by, for example, a valve body, and includes a primary regulator valve (not shown) that generates a line pressure or the like from a hydraulic pressure supplied from a mechanical oil pump or an electric oil pump (not shown). The hydraulic control device 6 can supply or discharge hydraulic pressures for controlling the clutch K0, the clutch WSC, a motor disconnection clutch CM described later, and the like based on control signals from the ECU 7. Therefore, the hydraulic control device 6 includes a linear solenoid valve for supplying or discharging the hydraulic pressure to each engagement element.

Next, the drive system for the rear wheels 12 will be described. The rear motor 80 that is an example of a drive source is connected to the battery 83 via an inverter 84, and is driven and performs regeneration as desired by power control from the inverter 84 based on drive commands from the ECU 7. The hybrid vehicle 100 can travel with a driving force of the rear motor 80 drivingly connected to the rear wheels 12. The rear motor 80 is drivingly connected to a gearbox 81 via the motor disconnection clutch CM. The gearbox 81 includes a reduction gear mechanism having a predetermined reduction ratio and a differential device (not shown). When the motor disconnection clutch CM is engaged, the speed of rotation of the rear motor 80 is reduced by the reduction gear mechanism of the gearbox 81, and the differential device transmits the rotation to the left and right rear wheels 12 while absorbing differential rotation of left and right axles 12*a*.

The ECU 7 includes, for example, a CPU, a ROM that stores processing programs, a RAM that temporarily stores data, and an input/output circuit. The ECU 7 outputs various electric commands such as a control signal for the hydraulic control device 6 and control signals for the inverters 82, 84. To detect the engagement statuses of the clutch K0 and the like, for example, an engine speed sensor (not shown) that detects a rotation speed of the output shaft 21 of the engine 2, the motor rotation speed sensor 71 that detects a rotation speed of the rotor shaft 41 of the motor 4, the input rotation speed sensor 72 that detects a rotation speed of the input shaft 51 of the transmission mechanism 5, and the output rotation speed sensor 73 that detects a rotation speed of the output shaft 52 of the transmission mechanism 5 are connected to the ECU 7.

The ECU 7 controls the engine speed Ne and the engine torque Te as desired by sending a command to the engine 2 via an engine control unit (not shown). The ECU 7 controls the friction engagement status of the clutch K0 as desired by sending a command to the hydraulic control device 6 to regulate and control the clutch hydraulic pressure. That is, the ECU 7 controls engagement and disengagement of the clutch K0 by an electric command. The ECU 7 controls electric power of the motor 4 via the inverter 82 to control a motor rotation speed Nm by rotation speed control and control a motor torque Tm by torque control as desired. The ECU 7 controls the friction engagement status of the clutch WSC as desired by sending a command to the hydraulic control device 6 to regulate and control the clutch hydraulic pressure. That is, the ECU 7 controls engagement and disengagement of the clutch WSC by an electric command. The ECU 7 executes control so as to control shifting (change the speed ratio) by selecting and determining a shift speed based on, for example, a vehicle speed and an accelerator operation amount and sending a command to the hydraulic control device 6 to hydraulically control the friction engagement elements (clutches and brakes). The ECU 7 controls electric power of the rear motor 80 via the inverter 84 to control a motor rotation speed by rotation speed control and control a motor torque by torque control as desired.

When the hybrid vehicle 100 structured as described above travels by using the driving force of the engine 2 and/or the motor 4, power output from the hybrid drive device 3 is transmitted to the front wheels 11 and the rear motor 80 is disconnected from the rear wheels 12 by disengaging the motor disconnection clutch CM. In the transmission mechanism 5, the hydraulic control device 6 is electronically controlled by determining an optimal shift speed by the ECU 7 based on a shift range, a vehicle speed, and an accelerator operation amount, and the shift speed is formed based on the shifting determination. When the power output from the hybrid drive device 3 is transmitted to the front wheels 11, the rear motor 80 is driven by engaging the motor disconnection clutch CM. Thus, the four-wheel drive can be achieved.

Figure 2:
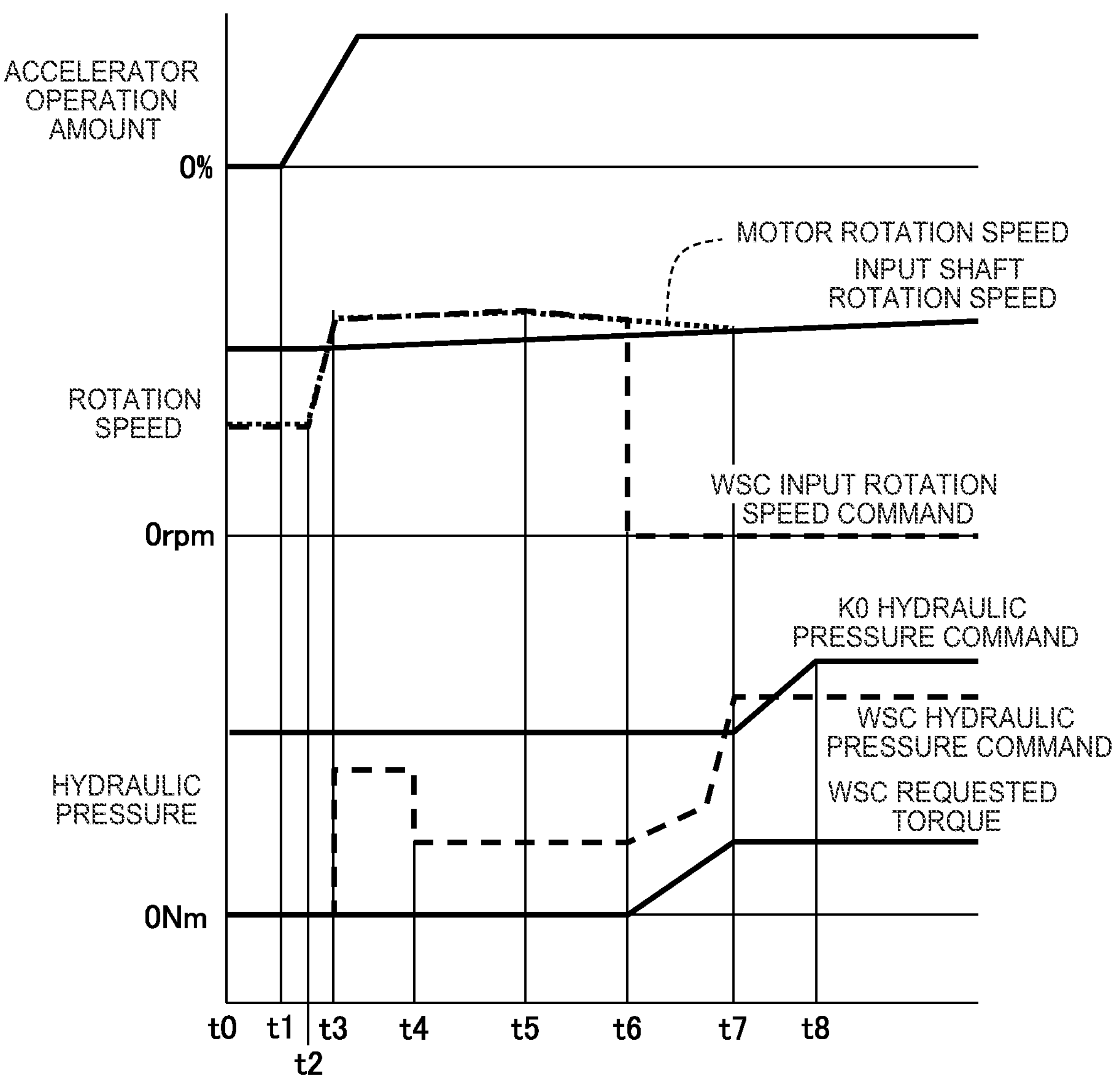
FIG. 2 is a time chart showing an operation in an accelerating state of the hybrid vehicle according to the embodiment.
Figure 3:
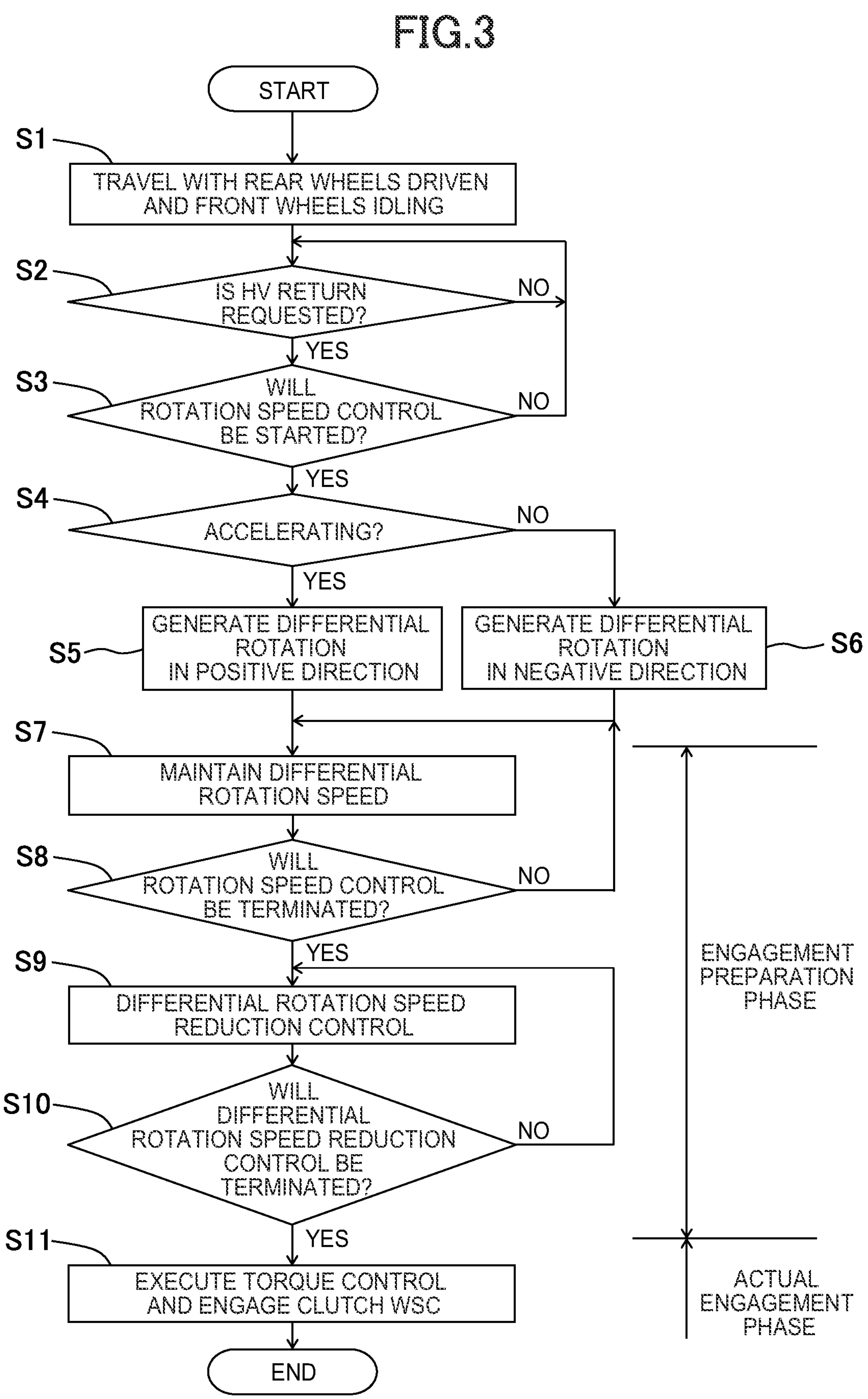
FIG. 3 is a flowchart showing an operation of the hybrid vehicle according to the embodiment.
Figure 4:
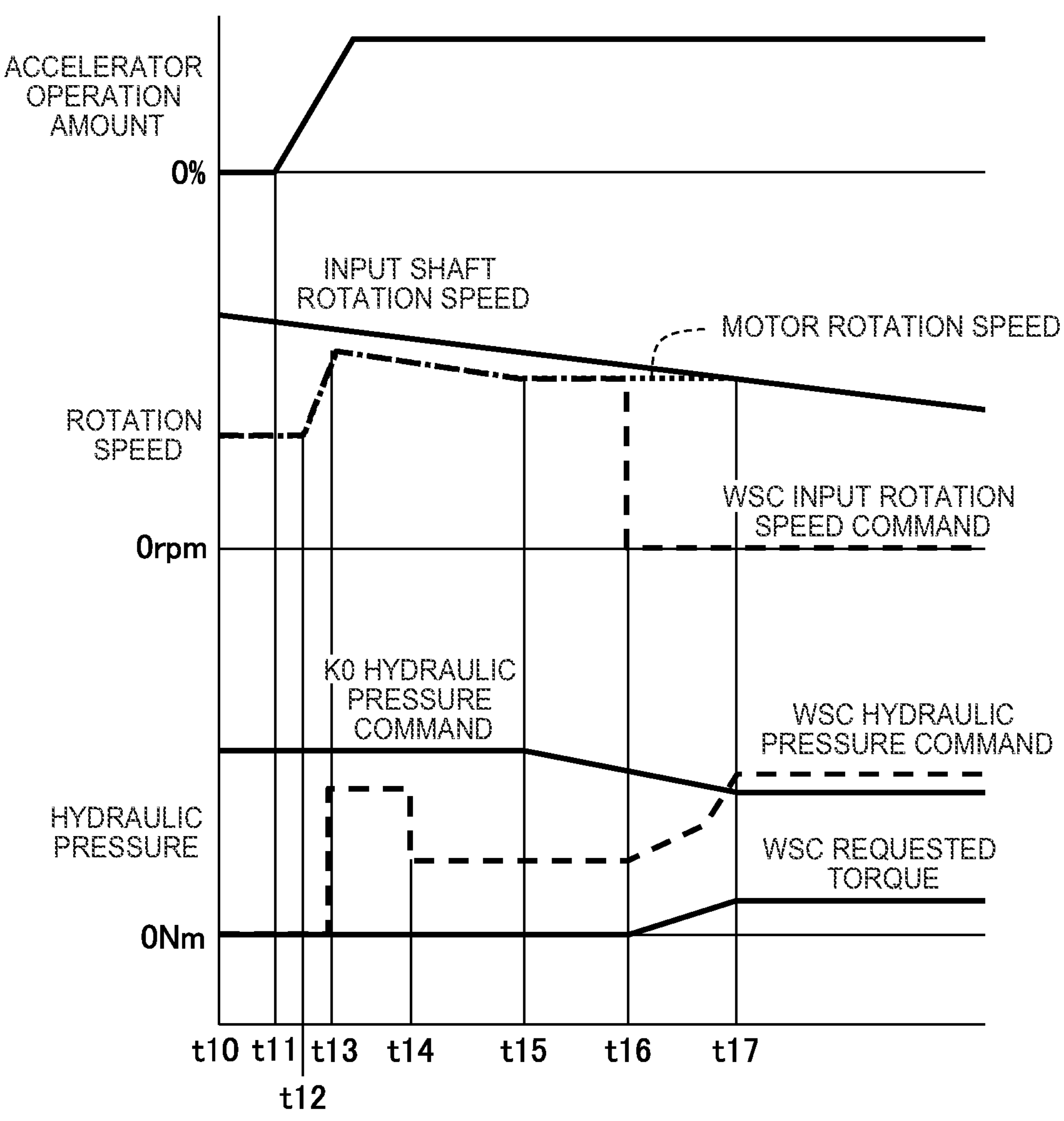
FIG. 4 is a time chart showing an operation in a decelerating state of the hybrid vehicle according to the embodiment.

Next, referring to FIGS. 2 to 4, detailed description will be given of operations for returning to the HV traveling using the front wheels 11 from a state in which the front wheels 11 are idling without the HV traveling and the hybrid vehicle 100 of the present embodiment is traveling by the EV traveling using the rear wheels 12.

First, referring to a time chart shown in FIG. 2 and a flowchart shown in FIG. 3, detailed description will be given of an operation for driving the front wheels 11 by starting the drive of the motor 4 when the EV traveling is executed by using the rear wheels 12, the front wheels 11 are idling, and the hybrid vehicle 100 is accelerating. Description will be given of a case where the hybrid vehicle 100 is accelerating by driving the rear wheels 12 by the rotation of the rear motor 80. This case includes, for example, a case where the hybrid vehicle 100 is accelerating while traveling along a downhill with the rear motor 80 driven.

The hybrid vehicle 100 is traveling with the rear wheels driven and the front wheels idling (t0, step S1). At this time, it is assumed that the front wheels 11 are rotated as the vehicle travels and the transmission mechanism 5 forms a shift speed associated with the vehicle speed. The clutch WSC is disengaged and the rotation of the input shaft 51 of the transmission mechanism 5 is not transmitted to the motor 4. The motor 4 is not energized and the engine 2 is idling. The clutch K0 is engaged and therefore the motor 4 is rotated along with the idling of the engine 2. The motor disconnection clutch CM is engaged and the rear wheels 12 are driven by the rotation of the rear motor 80. It is assumed that the hybrid vehicle 100 is accelerating by driving the rear motor 80 and the accelerator pedal and the brake device are not operated.

The ECU 7 determines whether there is a driver's request to return to the HV traveling (step S2). For example, the ECU 7 determines that there is an HV return request when the driver depresses the accelerator pedal without depressing the brake pedal. When the ECU 7 determines that there is no request to return to the HV traveling (NO in step S2), the ECU 7 determines again whether there is a request to return to the HV traveling (step S2).

When the ECU 7 determines that there is a request to return to the HV traveling (t1, YES in step S2), the ECU 7 determines whether a condition for starting rotation speed control is satisfied (step S3). When the ECU 7 determines that the condition for starting the rotation speed control is not satisfied (NO in step S3), the ECU 7 determines again whether there is a request to return to the HV traveling (step S2). When the ECU 7 determines that the condition for starting the rotation speed control is satisfied (YES in step S3), the ECU 7 starts the rotation speed control on the motor 4 (t2).

The ECU 7 determines whether the hybrid vehicle 100 is accelerating (step S4). The ECU 7 determines whether the hybrid vehicle 100 is accelerating based on, for example, a detection value of the output rotation speed sensor 73. When the ECU 7 determines that the hybrid vehicle 100 is accelerating (YES in step S4), the ECU 7 increases the rotation speed of the motor 4 so that the rotation speed is higher than a synchronous rotation speed with the input shaft 51, that is, differential rotation is generated in a positive direction (t2, step S5). The increase in the rotation speed of the motor 4 is desirably a sharp increase to improve a response. When the ECU 7 determines that the hybrid vehicle 100 is not accelerating (NO in step S4), the ECU 7 increases the rotation speed of the motor 4 so that the rotation speed is lower than the synchronous rotation speed with the input shaft 51, that is, the differential rotation is generated in a negative direction (t12 in FIG. 4, step S6). Details of the case where determination is made that the hybrid vehicle 100 is not accelerating will be described later.

The ECU 7 detects the rotation speed of the input shaft 51 based on a detection value of the input rotation speed sensor 72, and detects the rotation speed of the motor 4 based on a detection value of the motor rotation speed sensor 71. When controlling the rotation speed of the motor 4 to be higher than the synchronous rotation speed with the input shaft 51, the ECU 7 sets the rotation speed of the motor 4 to be higher than the rotation speed of the input shaft 51 by a first set value (t3). That is, when the hybrid vehicle 100 is accelerating, the ECU 7 executes control so that the rotation speed of the motor 4 is higher than the rotation speed of the input shaft 51 and the differential rotation speed between the rotation speed of the motor 4 and the rotation speed of the input shaft 51 is the first set value. The first set value can be, for example, 100 rpm.

The ECU 7 starts engagement control on the clutch WSC (t3) by setting the rotation speed of the motor 4 to be higher than the rotation speed of the input shaft 51 by the first set value. In the present embodiment, the ECU 7 makes engagement determination (t3) when the clutch WSC is disengaged, and then executes, in the engagement control (t3 to t7) to change the clutch WSC from the disengaged state to the fully engaged state, an engagement preparation phase (t3 to t6) in which no torque capacity is generated and an actual engagement phase (t6 to t7) in which the torque capacity is generated and the fully engaged state is achieved.

In the engagement preparation phase, the ECU 7 executes fast fill (t3 to t4), and waits by reducing the pressure to a standby pressure so as not to generate the torque capacity (t4 to t6). During this period, the ECU 7 maintains the differential rotation speed in which the rotation speed of the motor 4 is higher than the rotation speed of the input shaft 51 by the first set value (t3 to t5, step S7).

The ECU 7 determines whether to terminate the rotation speed control on the motor 4 (step S8). The ECU 7 determines whether to terminate the rotation speed control on the motor 4, for example, based on whether a predetermined period has elapsed. The rotation speed of the motor 4 can be stabilized by requiring the elapse of the predetermined period. When the ECU 7 determines not to terminate the rotation speed control on the motor 4 (NO in step S8), the ECU 7 continues the rotation speed control by maintaining the differential rotation speed in which the rotation speed of the motor 4 is higher than the rotation speed of the input shaft 51 by the first set value (t3 to t5, step S7).

When the ECU 7 determines to terminate the rotation speed control on the motor 4 (YES in step S8), the ECU 7 starts rotation speed control for reducing the differential rotation speed (step S9). In the rotation speed control for reducing the differential rotation speed, the ECU 7 gradually reduces the differential rotation speed until the differential rotation speed reaches a third set value (15 to t6). That is, when the hybrid vehicle 100 is accelerating during execution of the engagement preparation phase, the ECU 7 controls, after the differential rotation speed reaches the first set value, the differential rotation speed to decrease along a predetermined gradient to the third set value higher than the rotation speed of the input shaft 51 and smaller than the first set value in terms of the absolute value.

The ECU 7 determines whether to terminate the differential rotation speed reduction control (step S10). The ECU 7 determines whether to terminate the differential rotation speed reduction control, for example, based on whether the differential rotation speed has reached the third set value. When the ECU 7 determines not to terminate the differential rotation speed reduction control (NO in step S10), the ECU 7 continues the differential rotation speed reduction control (t5 to t6, step S9).

When the ECU 7 determines to terminate the differential rotation speed reduction control (YES in step S10), the ECU 7 terminates the differential rotation speed reduction control and makes switching to torque control (t6, step S11). The ECU 7 increases the engagement pressure of the clutch WSC by increasing the requested torque of the clutch WSC, and makes switching from the engagement preparation phase to the actual engagement phase (t6, step S11). The requested torque of the clutch WSC is 0 Nm until t6, and increases from t6 in a sweeping manner. Thus, the clutch WSC has a torque capacity and the differential rotation speed decreases.

The ECU 7 brings the clutch WSC into the fully engaged state through the slip-engaged state (t7). That is, when the hybrid vehicle 100 is accelerating, the ECU 7 terminates the engagement preparation phase in response to the differential rotation speed reaching the third set value, and starts to execute the actual engagement phase. The ECU 7 executes the rotation speed control on the motor 4 in the engagement preparation phase, and executes torque control on the motor 4 in the actual engagement phase.

When the rotation speed of the motor 4 and the rotation speed of the input shaft 51 are synchronized along with the full engagement of the clutch WSC (t7), the ECU 7 further increases the engagement pressure of the clutch K0 to prepare for an increase in the engine torque (t7 to t8).

Next, referring to a time chart shown in FIG. 4 and the flowchart shown in FIG. 3, detailed description will be given of an operation for driving the front wheels 11 by starting the drive of the motor 4 when the EV traveling is executed by using the rear wheels 12, the front wheels 11 are idling, and the hybrid vehicle 100 is decelerating. Description will be given of a case where the hybrid vehicle 100 is decelerating with the rear motor 80 driven. This case includes, for example, a case where the hybrid vehicle 100 is decelerating while traveling along an uphill with the rear motor 80 driving. Since the flowchart shown in FIG. 2 is the same as that in the above description, detailed description thereof will be omitted.

The hybrid vehicle 100 is traveling with the rear wheels driven and the front wheels idling (t10, step S1). The ECU 7 determines whether there is a driver's request to return to the HV traveling (step S2). When the ECU 7 determines that there is a request to return to the HV traveling (t11, YES in step S2), the ECU 7 determines whether a condition for starting rotation speed control is satisfied (step S3). When the ECU 7 determines that the condition for starting the rotation speed control is satisfied (YES in step S3), the ECU 7 starts the rotation speed control on the motor 4 (t12).

The ECU 7 determines whether the hybrid vehicle 100 is accelerating (step S4). When the ECU 7 determines that the hybrid vehicle 100 is not accelerating, that is, the hybrid vehicle 100 is decelerating (NO in step S4), the ECU 7 increases the rotation speed of the motor 4 so that the rotation speed is lower than the synchronous rotation speed with the input shaft 51, that is, the differential rotation is generated in a negative direction (t12, step S6).

The ECU 7 detects the rotation speed of the input shaft 51 based on a detection value of the input rotation speed sensor 72, and detects the rotation speed of the motor 4 based on a detection value of the motor rotation speed sensor 71. When controlling the rotation speed of the motor 4 to be lower than the synchronous rotation speed with the input shaft 51, the ECU 7 sets the rotation speed of the motor 4 to be lower than the rotation speed of the input shaft 51 by a second set value (t13). That is, when the hybrid vehicle 100 is decelerating, the ECU 7 executes control so that the rotation speed of the motor 4 is lower than the rotation speed of the input shaft 51 and the differential rotation speed between the rotation speed of the motor 4 and the rotation speed of the input shaft 51 is the second set value. The second set value can be, for example, 100 rpm. The second set value may be equal to or different from the first set value.

The ECU 7 starts engagement control on the clutch WSC (t13) by setting the rotation speed of the motor 4 to be lower than the rotation speed of the input shaft 51 by the second set value. In the engagement preparation phase, the ECU 7 executes fast fill (t13 to t14), and waits by reducing the pressure to a standby pressure so as not to generate the torque capacity (t14 to 6F). During this period, the ECU 7 maintains the differential rotation speed in which the rotation speed of the motor 4 is lower than the rotation speed of the input shaft 51 by the second set value (t13 to t15, step S7).

The ECU 7 determines whether to terminate the rotation speed control on the motor 4 (step S8). The ECU 7 determines whether to terminate the rotation speed control on the motor 4, for example, based on whether a predetermined period has elapsed. When the ECU 7 determines not to terminate the rotation speed control on the motor 4 (NO in step S8), the ECU 7 continues the rotation speed control by maintaining the differential rotation speed in which the rotation speed of the motor 4 is higher than the rotation speed of the input shaft 51 by the first set value (t13 to t15, step S7).

When the ECU 7 determines to terminate the rotation speed control on the motor 4 (YES in step S8), the ECU 7 starts rotation speed control for reducing the differential rotation speed (step S9). In the rotation speed control for reducing the differential rotation speed, the ECU 7 gradually reduces the differential rotation speed until the differential rotation speed reaches a fourth set value (t15 to t16). That is, when the hybrid vehicle 100 is decelerating during execution of the engagement preparation phase, the ECU 7 controls, after the differential rotation speed reaches the second set value, the differential rotation speed to decrease along a predetermined gradient to the fourth set value lower than the rotation speed of the input shaft 51 and smaller than the second set value in terms of the absolute value. Since the engine torque decreases from this time (t15), the engagement pressure of the clutch K0 is reduced. The fourth set value may be equal to or different from the third set value.

The ECU 7 determines whether to terminate the differential rotation speed reduction control (step S10). The ECU 7 determines whether to terminate the differential rotation speed reduction control, for example, based on whether the differential rotation speed has reached the fourth set value. When the ECU 7 determines not to terminate the differential rotation speed reduction control (NO in step S10), the ECU 7 continues the differential rotation speed reduction control (t15 to t16, step S9).

When the ECU 7 determines to terminate the differential rotation speed reduction control (YES in step S10), the ECU 7 terminates the differential rotation speed reduction control and makes switching to torque control (t16, step S11). The ECU 7 increases the engagement pressure of the clutch WSC by increasing the requested torque of the clutch WSC, and makes switching from the engagement preparation phase to the actual engagement phase (t16, step S11). The ECU 7 brings the clutch WSC into the fully engaged state through the slip-engaged state (t17). That is, when the hybrid vehicle 100 is decelerating, the ECU 7 terminates the engagement preparation phase in response to the differential rotation speed reaching the fourth set value, and starts to execute the actual engagement phase. The ECU 7 executes the rotation speed control on the motor 4 in the engagement preparation phase, and executes torque control on the motor 4 in the actual engagement phase.

As described above, according to the hybrid drive device 3 of the present embodiment, when the hybrid vehicle 100 is accelerating while returning to the HV traveling from the state in which the HV traveling is not executed, control is executed so that the rotation speed of the motor 4 is higher than the rotation speed of the input shaft 51 and the differential rotation speed between the rotation speed of the motor 4 and the rotation speed of the input shaft 51 is the first set value. Therefore, the rotation speed of the motor 4 is synchronized with the rotation speed of the input shaft 51 from the higher side of the rotation speed. Thus, even if the engagement is achieved before reaching the synchronous rotation speed due to a control delay or a deviation, the inertia shock occurs in the accelerating direction. Because of the accelerating state, the shock can be reduced. That is, if the engagement is achieved with the motor 4 having a lower rotation speed than the synchronous rotation speed during acceleration, a large inertia shock is likely to occur in a direction opposite to the accelerating direction. Since the engagement is achieved with the motor 4 having a higher rotation speed than the synchronous rotation speed in the present embodiment, the inertia shock occurs in the same direction as the accelerating direction. Thus, the shock can be reduced. Accordingly, a decrease in drivability can be suppressed.

Similarly, according to the hybrid drive device 3 of the present embodiment, when the hybrid vehicle 100 is decelerating while returning to the HV traveling from the state in which the HV traveling is not executed, control is executed so that the rotation speed of the motor 4 is lower than the rotation speed of the input shaft 51 and the differential rotation speed between the rotation speed of the motor 4 and the rotation speed of the input shaft 51 is the second set value. Therefore, the rotation speed of the motor 4 is synchronized with the rotation speed of the input shaft 51 from the lower side of the rotation speed. Thus, even if the engagement is achieved before reaching the synchronous rotation speed due to a control delay or a deviation, the inertia shock occurs in the decelerating direction. Because of the decelerating state, the shock can be reduced. That is, if the engagement is achieved with the motor 4 having a higher rotation speed than the synchronous rotation speed during deceleration, a large inertia shock is likely to occur in a direction opposite to the decelerating direction. Since the engagement is achieved with the motor 4 having a lower rotation speed than the synchronous rotation speed in the present embodiment, the inertia shock occurs in the same direction as the decelerating direction. Thus, the shock can be reduced. Accordingly, the decrease in drivability can be suppressed.

According to the hybrid drive device 3 of the present embodiment, when the hybrid vehicle 100 is accelerating during execution of the engagement preparation phase for the clutch WSC, the ECU 7 controls, after the differential rotation speed reaches the first set value, the differential rotation speed to decrease along the predetermined gradient to the third set value higher than the rotation speed of the input shaft 51 and smaller than the first set value in terms of the absolute value. When the hybrid vehicle 100 is decelerating during execution of the engagement preparation phase for the clutch WSC, the ECU 7 controls, after the differential rotation speed reaches the second set value, the differential rotation speed to decrease along the predetermined gradient to the fourth set value lower than the rotation speed of the input shaft 51 and smaller than the second set value in terms of the absolute value. Therefore, the rotation speed of the motor 4 can gradually be brought closer to the synchronous rotation speed, thereby reducing the shock at the time of engagement.

According to the hybrid drive device 3 of the present embodiment, when the hybrid vehicle 100 is accelerating, the ECU 7 terminates the engagement preparation phase in response to the differential rotation speed reaching the third set value, and starts to execute the actual engagement phase. When the hybrid vehicle 100 is decelerating, the ECU 7 terminates the engagement preparation phase in response to the differential rotation speed reaching the fourth set value, and starts to execute the actual engagement phase. Since the actual engagement phase is started after the differential rotation speed is reduced sufficiently, the period to execute the actual engagement phase can be shortened. Thus, the response can be increased and the fuel efficiency can be improved by shortening the period of the slip-engaged state.

According to the hybrid drive device 3 of the present embodiment, the ECU 7 executes the rotation speed control on the motor 4 in the engagement preparation phase, and executes the torque control on the motor 4 in the actual engagement phase. Thus, the response can be increased.

According to the hybrid drive device 3 of the present embodiment, the clutch input shaft 31, the clutch K0, the motor 4, the clutch WSC, and the transmission mechanism 5 are drivingly connected in series in this order to the power transmission path from the engine 2 to the front wheel 11. Therefore, the hybrid drive device 3 can be applied to a so-called one-motor parallel type.

Summary of Embodiment

The vehicle drive device (3) includes:

a rotary electric machine (4);

a first clutch (WSC) interposed between the rotary electric machine (4) and a transmission member (51) drivingly connected to one wheel (11) out of a front wheel (11) and a rear wheel (12) and configured to connect or disconnect power transmission between the rotary electric machine (4) and the transmission member (51); and a control device (7) that controls engagement and disengagement of the first clutch (WSC), in which in engagement control for changing the first clutch (WSC) from a disengaged state to a fully engaged state after engagement determination is made when the first clutch (WSC) is disengaged, in a case where a vehicle is traveling with a driving force of a drive source (80) drivingly connected to the other wheel (12) out of the front wheel (11) and the rear wheel (12) when executing the engagement control, the control device (7):

controls a rotation speed of the rotary electric machine (4) to be higher than a rotation speed of the transmission member (51) when the vehicle is accelerating; and controls the rotation speed of the rotary electric machine (4) to be lower than the rotation speed of the transmission member (51) when the vehicle is decelerating.

Therefore, the rotation speed of the rotary electric machine (4) is synchronized with the rotation speed of the transmission member (51) from the higher side of the rotation speed. Thus, even if the engagement is achieved before reaching the synchronous rotation speed due to a control delay or a deviation, the inertia shock occurs in the accelerating direction. Because of the accelerating state, the shock can be reduced. Similarly, the rotation speed of the rotary electric machine (4) is synchronized with the rotation speed of the transmission member (51) from the lower side of the rotation speed. Thus, even if the engagement is achieved before reaching the synchronous rotation speed due to a control delay or a deviation, the inertia shock occurs in the decelerating direction. Because of the decelerating state, the shock can be reduced. Accordingly, the decrease in drivability can be suppressed in either case.

In the vehicle drive device (3), the control device (7):

controls the rotation speed of the rotary electric machine (4) so that a differential rotation speed between the rotation speed of the rotary electric machine (4) and the rotation speed of the transmission member (51) reaches a first set value when the vehicle is accelerating; and controls the rotation speed of the rotary electric machine (4) so that the differential rotation speed reaches a second set value when the vehicle is decelerating.

Accordingly, an appropriate differential rotation speed can be obtained by presetting the first set value and the second set value, thereby reducing the shock more effectively.

In the vehicle drive device (3), the control device (7):

executes, in the engagement control, an engagement preparation phase in which no torque capacity is generated and an actual engagement phase in which a torque capacity is generated and the fully engaged state is achieved; and during execution of the engagement preparation phase, when the vehicle is accelerating, controls, after the differential rotation speed reaches the first set value, the differential rotation speed to decrease along a predetermined gradient to a third set value higher than the rotation speed of the transmission member (51) and smaller than the first set value in terms of an absolute value, and when the vehicle is decelerating, controls, after the differential rotation speed reaches the second set value, the differential rotation speed to decrease along a predetermined gradient to a fourth set value lower than the rotation speed of the transmission member (51) and smaller than the second set value in terms of the absolute value.

Therefore, the rotation speed of the rotary electric machine (4) can gradually be brought closer to the synchronous rotation speed, thereby effectively reducing the shock at the time of engagement.

In the vehicle drive device (3), the control device (7):

terminates the engagement preparation phase in response to the differential rotation speed reaching the third set value, and starts to execute the actual engagement phase when the vehicle is accelerating; and terminates the engagement preparation phase in response to the differential rotation speed reaching the fourth set value, and starts to execute the actual engagement phase when the vehicle is decelerating.

Since the actual engagement phase is started after the differential rotation speed is reduced sufficiently, the period to execute the actual engagement phase can be shortened. Thus, the response can be increased and the fuel efficiency can be improved by shortening the period of the slip-engaged state.

In the vehicle drive device (3), the control device (7):

executes rotation speed control on the rotary electric machine (4) in the engagement preparation phase; and executes torque control on the rotary electric machine (4) in the actual engagement phase.

Thus, the response can be increased, thereby suppressing the decrease in drivability more effectively.

the vehicle drive device (3) includes:

an engine connection member (31) drivingly connected to an engine (2);

a second clutch (K0) that is interposed between the engine connection member (31) and the rotary electric machine (4) and that is able to connect or disconnect power transmission between the engine connection member (31) and the rotary electric machine (4); and a transmission mechanism (5) that includes an input member (51) that is the transmission member (51) and an output member (52) drivingly connected to the one wheel (11), and that is able to change a speed ratio between the input member (51) and the output member (52), in which the engine connection member (31), the second clutch (K0), the rotary electric machine (4), the first clutch (WSC), and the transmission mechanism (5) are drivingly connected in series in this order to a power transmission path from the engine (2) to the one wheel (11).

Therefore, the vehicle drive device (3) can be applied to a so-called one-motor parallel type. In such a vehicle drive device (3), the shock can be reduced and the decrease in drivability can be suppressed.

In the hybrid drive device 3 of the present embodiment described above, the description has been given of the case where the vehicle returns to the HV traveling from the state in which the clutch K0 is engaged and the engine 2 is idling. However, the present disclosure is not limited to this. For example, the vehicle may return to the HV traveling from a state in which the clutch K0 is disengaged and the engine 2 is stopped. In this case as well, the engagement of the clutch WSC, the operation of the motor 4, and the like can be controlled in similar methods.

In the hybrid drive device 3 of the present embodiment, the description has been given of the case where the clutch WSC is applied as the first clutch, but the present disclosure is not limited to this. For example, even in a train that does not have the clutch WSC, a clutch that forms a shift speed in the transmission mechanism 5 may be controlled as the first clutch.

In the hybrid drive device 3 of the present embodiment, the description has been given of the case where the ECU 7 executes, in the engagement control, the engagement preparation phase in which no torque capacity is generated and the actual engagement phase in which the torque capacity is generated and the fully engaged state is achieved. However, the present disclosure is not limited to this. For example, the engagement control may include only the actual engagement phase without the engagement preparation phase.

In the hybrid drive device 3 of the present embodiment, when the hybrid vehicle 100 is accelerating during execution of the engagement preparation phase for the clutch WSC, the ECU 7 controls, after the differential rotation speed reaches the first set value, the differential rotation speed to decrease along the predetermined gradient to the third set value higher than the rotation speed of the input shaft 51 and smaller than the first set value in terms of the absolute value. However, the present disclosure is not limited to this. Any other method may be used as long as control is executed so that the rotation speed of the motor 4 is higher than the rotation speed of the input shaft 51 and the differential rotation speed reaches the first set value. When the hybrid vehicle 100 is decelerating during execution of the engagement preparation phase for the clutch WSC, the ECU 7 controls, after the differential rotation speed reaches the second set value, the differential rotation speed to decrease along the predetermined gradient to the fourth set value lower than the rotation speed of the input shaft 51 and smaller than the second set value in terms of the absolute value. However, the present disclosure is not limited to this. Any other method may be used as long as control is executed so that the rotation speed of the motor 4 is lower than the rotation speed of the input shaft 51 and the differential rotation speed reaches the second set value. In either case, the ECU 7 can execute the rotation speed control on the motor 4 in the engagement preparation phase, and execute the torque control on the motor 4 in the actual engagement phase.

According to the hybrid drive device 3 of the present embodiment, when the hybrid vehicle 100 is accelerating, the ECU 7 terminates the engagement preparation phase in response to the differential rotation speed reaching the third set value, and starts to execute the actual engagement phase. However, the present disclosure is not limited to this. The engagement preparation phase may be terminated under any other condition and the actual engagement phase may be started. When the hybrid vehicle 100 is decelerating, the ECU 7 terminates the engagement preparation phase in response to the differential rotation speed reaching the fourth set value, and starts to execute the actual engagement phase. However, the present disclosure is not limited to this. The engagement preparation phase may be terminated under any other condition and the actual engagement phase may be started. In either case, the ECU 7 can execute the rotation speed control on the motor 4 in the engagement preparation phase, and execute the torque control on the motor 4 in the actual engagement phase.

The description has been given of the case where the hybrid drive device 3 of the present embodiment includes the transmission mechanism 5, but the present disclosure is not limited to this. A power transmission mechanism that does not execute shifting may be applied in place of the transmission mechanism 5.

In the hybrid vehicle 100 of the present embodiment, the description has been given of the case where the rear motor 80 is applied as the drive source that drives the rear wheels 12, but the present disclosure is not limited to this. The engine may be applied as the drive source. In the present embodiment, the description has been given of the case where the hybrid drive device 3 connected to the engine 2 is applied as the vehicle drive device that drives the front wheels, but the present disclosure is not limited to this. The front wheels 11 may be driven by an EV drive device.

Therefore, the control of the present embodiment can be applied, for example, when a vehicle that executes EV driving for the front wheels 11 and engine driving for the rear wheels 12 returns to the EV driving for the front wheels 11 while traveling with the rear wheels 12 by the engine driving.

INDUSTRIAL APPLICABILITY

The vehicle drive device according to the present disclosure can be applied to, for example, a vehicle drive device including a rotary electric machine and a first clutch that are mounted on a vehicle such as an automobile.

DESCRIPTION OF THE REFERENCE NUMERALS

2 . . . engine, 3 . . . hybrid drive device (vehicle drive device), 4 . . . motor generator (rotary electric machine), 5 . . . transmission mechanism, 7 . . . . ECU (control device), 11 . . . front wheel (one wheel), 12 . . . rear wheel (other wheel), 31 . . . clutch input shaft (engine connection member), 51 . . . input shaft (transmission member, input member), 52 . . . output shaft (output member), 80 . . . rear motor (drive source), K0 . . . clutch (second clutch), WSC . . . clutch (first clutch)

The invention claimed is:

1. A vehicle drive device comprising:

a rotary electric machine;

a first clutch that is interposed between the rotary electric machine and a transmission member drivingly connected to one wheel out of a front wheel and a rear wheel and that is able to connect or disconnect power transmission between the rotary electric machine and the transmission member; and a control device that controls engagement and disengagement of the first clutch, wherein in engagement control for changing the first clutch from a disengaged state to a fully engaged state after engagement determination is made when the first clutch is disengaged, in a case where a vehicle is traveling with a driving force of a drive source drivingly connected to the other wheel out of the front wheel and the rear wheel when executing the engagement control, the control device:

controls a rotation speed of the rotary electric machine to be higher than a rotation speed of the transmission member when the vehicle is accelerating; and controls the rotation speed of the rotary electric machine to be lower than the rotation speed of the transmission member when the vehicle is decelerating.

2. The vehicle drive device according to claim 1, wherein the control device:

controls the rotation speed of the rotary electric machine so that a differential rotation speed between the rotation speed of the rotary electric machine and the rotation speed of the transmission member reaches a first set value when the vehicle is accelerating; and controls the rotation speed of the rotary electric machine so that the differential rotation speed reaches a second set value when the vehicle is decelerating.

3. The vehicle drive device according to claim 2, wherein the control device:

executes, in the engagement control, an engagement preparation phase in which no torque capacity is generated and an actual engagement phase in which a torque capacity is generated and the fully engaged state is achieved; and during execution of the engagement preparation phase, when the vehicle is accelerating, controls, after the differential rotation speed reaches the first set value, the differential rotation speed to decrease along a predetermined gradient to a third set value higher than the rotation speed of the transmission member and smaller than the first set value in terms of an absolute value, and when the vehicle is decelerating, controls, after the differential rotation speed reaches the second set value, the differential rotation speed to decrease along a predetermined gradient to a fourth set value lower than the rotation speed of the transmission member and smaller than the second set value in terms of the absolute value.

4. The vehicle drive device according to claim 3, wherein the control device:

terminates the engagement preparation phase in response to the differential rotation speed reaching the third set value, and starts to execute the actual engagement phase when the vehicle is accelerating; and terminates the engagement preparation phase in response to the differential rotation speed reaching the fourth set value, and starts to execute the actual engagement phase when the vehicle is decelerating.

5. The vehicle drive device according to claim 3, wherein the control device:

executes rotation speed control on the rotary electric machine in the engagement preparation phase; and executes torque control on the rotary electric machine in the actual engagement phase.

6. The vehicle drive device according to claim 1, further comprising:

an engine connection member drivingly connected to an engine;

a second clutch that is interposed between the engine connection member and the rotary electric machine and that is able to connect or disconnect power transmission between the engine connection member and the rotary electric machine; and a transmission mechanism that includes an input member that is the transmission member and an output member drivingly connected to the one wheel, and that is able to change a speed ratio between the input member and the output member, wherein the engine connection member, the second clutch, the rotary electric machine, the first clutch, and the transmission mechanism are drivingly connected in series in this order to a power transmission path from the engine to the one wheel.

* * * * *